United States Patent
Ausman et al.

(10) Patent No.: US 8,340,842 B2
(45) Date of Patent: Dec. 25, 2012

(54) AIRCRAFT EMERGENCY HANDLING

(75) Inventors: Marc Ausman, Albuquerque, NM (US); Kevin DeVries, Albuquerque, NM (US)

(73) Assignee: Vertical Power, Inc., Albuquerque, NM (US)

( * ) Notice: Subject to any disclaimer, the term of this patent is extended or adjusted under 35 U.S.C. 154(b) by 1072 days.

(21) Appl. No.: 11/875,813

(22) Filed: Oct. 19, 2007

(65) Prior Publication Data

US 2009/0306836 A1    Dec. 10, 2009

Related U.S. Application Data

(63) Continuation-in-part of application No. 11/311,060, filed on Dec. 19, 2005.

(60) Provisional application No. 60/853,712, filed on Oct. 23, 2006.

(51) Int. Cl.
*B64C 19/00* (2006.01)
*G08B 21/00* (2006.01)
*G08B 23/00* (2006.01)
*G06F 17/00* (2006.01)

(52) U.S. Cl. .............. 701/9; 701/11; 340/945; 340/963; 244/76 R (58) Field of Classification Search .................. 701/1, 3, 701/8–11, 14; 340/945, 963, 964; 244/75.1, 244/76 R
See application file for complete search history.

(56) References Cited

U.S. PATENT DOCUMENTS

| | | | |
|---|---|---|---|
| 4,127,847 A | 11/1978 | Stifter | |
| 4,191,347 A | 3/1980 | Fueyo | |
| 4,243,970 A | 1/1981 | Hardee et al. | |
| 4,409,635 A | 10/1983 | Kraus | |
| 4,452,207 A | 6/1984 | Moore, Jr. | |
| 4,598,890 A | 7/1986 | Herzog et al. | |
| 4,649,484 A | 3/1987 | Herzog et al. | |
| 4,729,102 A | 3/1988 | Miller | |
| 5,001,638 A | 3/1991 | Zimmerman | |
| 5,082,208 A | 1/1992 | Matich | |
| 5,353,657 A | 10/1994 | Bainbridge, III | |
| 5,497,072 A | 3/1996 | LeComte et al. | |
| 5,723,915 A | 3/1998 | Maher et al. | |
| 5,864,221 A | 1/1999 | Downs et al. | |
| 5,913,492 A | 6/1999 | Durandeau et al. | |

(Continued)

OTHER PUBLICATIONS

Web pages at http://www.tcwtech.com/, (visited on Jan. 26, 2008 and Jan. 27, 2008).

*Primary Examiner* — Thomas Tarcza
*Assistant Examiner* — Edward Pipala
(74) *Attorney, Agent, or Firm* — V. Gerald Grafe (57) ABSTRACT

The present invention provides methods and apparatuses that reduce pilot workload and increase the performance and efficiency of the pilot's control of the aircraft. The present invention comprises methods and apparatuses for determining the presence and type of an emergency condition, for example by detecting corresponding sensor outputs or by accepting input from a pilot or a combination thereof; and then responding to that emergency by initiating a pre-determined set of actions specific to the determined emergency. Embodiments of the invention can include the ability to monitor engine conditions as well as control electrical functions such as the fuel boost pump, alternator field, battery contactor and other important electrical devices. Some examples described below assume a single-engine piston aircraft for ease of illustration. The invention can also be applied to multi engine and turbine powered aircraft as well.

21 Claims, 12 Drawing Sheets

U.S. PATENT DOCUMENTS

| | | |
|---|---|---|
| 5,941,222 A | 8/1999 | Braly |
| 6,325,333 B1 | 12/2001 | Najmabadi et al. |
| 6,346,892 B1 | 2/2002 | DeMers et al. |
| 6,556,902 B2 | 4/2003 | Ing et al. |
| 6,639,522 B2 | 10/2003 | Derderian |
| 6,664,945 B1 | 12/2003 | Gyde et al. |
| 6,700,482 B2 | 3/2004 | Ververs et al. |
| 6,754,567 B2 | 6/2004 | Bernard |
| 6,824,099 B1 | 11/2004 | Jones |
| 6,842,672 B1 | 1/2005 | Straub et al. |
| 6,859,688 B1 | 2/2005 | Orf et al. |
| 7,021,587 B1 | 4/2006 | Younkin |
| 7,039,518 B2 | 5/2006 | Ingram et al. |
| 2002/0035415 A1 | 3/2002 | Gardner |
| 2002/0035416 A1 | 3/2002 | De Leon |
| 2003/0048203 A1 | 3/2003 | Clary |
| 2005/0187677 A1* | 8/2005 | Walker .......................... 701/16 |
| 2010/0076630 A1* | 3/2010 | Vian et al. ...................... 701/14 |

* cited by examiner

AIRCRAFT EMERGENCY HANDLING

CROSS-REFERENCE TO RELATED APPLICATIONS

This application claims the benefit of U.S. provisional application 60/853,712, filed Oct. 23, 2006, which is incorporated herein by reference. This application claims the benefit as a continuation-in-part of U.S. patent application Ser. No. 11/311,060, filed Dec. 19, 2005, which is incorporated herein by reference.

This application is related to the following applications, each of which is incorporated herein by reference:

Backup Electrical Power System for Solid-State Aircraft Power Distribution Systems, U.S. patent application Ser. No. 11/875,815, filed on the same date hereof;

Aircraft Electrical System Evaluation, U.S. patent application Ser. No. 11/875,816, filed on the same date hereof;

Aircraft Exhaust Gas Temperature Monitor, U.S. patent application Ser. No. 11/875,818, filed on the same date hereof;

Variable Speed Flap Retraction and Notification, U.S. patent application Ser. No. 11/875,819, filed on the same date hereof.

FIELD OF THE INVENTION

This invention relates to the field of aircraft control, and more specifically to assisting of pilots in the management of emergency conditions.

BACKGROUND OF THE INVENTION

The present invention relates to control of aircraft. Modern commercial/private aircraft, as well as older aircraft, include a myriad of instrumentation panels associated with electronic devices having controls, displays, and software applications, which are used to present information to pilots and/or copilots during flight. The electronic devices, controls, displays and applications are interfaced together to form avionics equipment within the aircraft. Pilots (where "pilot" includes copilots and any other controller of the aircraft) access one or more interface devices of the avionics equipment prior to and during the flight. Some of this information presented monitors the status of equipment on the aircraft, while other switches and knobs are used to control functions of the aircraft such as throttles (engine speed), switches (lights, radios, etc), levers (landing gear and flaps), and controls for navigation, for example.

Avionics are important because they enable the pilot to control the aircraft, monitor and control its systems, and navigate the aircraft. Avionics systems today are generally manual: the pilot must manually select the proper switch, knob, etc. to control a certain function in response to aircraft and environmental conditions. This action can be the result of normal activities, and is usually read from a checklist so as not to miss anything; or can be the result of a warning display, at which time the pilot must react accordingly. Pilot error, in the form of not knowing what to do or reacting improperly, leads to increased accident and death rates. Crashes can also result from pilots being distracted by an emergency and not maintaining control of the aircraft because they are busy troubleshooting or reacting to the problem. Such actions have the possibility to distract the pilot's awareness from the surrounding situation, or the state of the aircraft in flight.

General aviation accident statistics show that the accident rate for single pilot, non professionally flown aircraft is significantly greater than that for dual-pilot professionally flown aircraft. Accordingly, there is a need for methods and apparatuses that reduce pilot workload and increase the performance and efficiency of the pilot's control of the aircraft through automation. This ensures both a proper response to certain emergencies, and allows the pilot to focus on flying the aircraft.

SUMMARY OF THE INVENTION

The present invention provides methods and apparatuses that reduce pilot workload and increase the performance and efficiency of the pilot's control of the aircraft. The present invention comprises methods and apparatuses for determining the presence and type of an emergency condition, for example by detecting corresponding sensor outputs or by accepting input from a pilot or a combination thereof; and then responding to that emergency by initiating a pre-determined set of actions specific to the determined emergency. Embodiments of the invention can include the ability to monitor engine conditions as well as control electrical functions such as the fuel boost pump, alternator field, battery contactor and other important electrical devices. Some examples described below assume a single-engine piston aircraft for ease of illustration. The invention can also be applied to multi engine and turbine powered aircraft as well.

A graphical display, such as a liquid crystal display, a heads up display, or other visual communication technology, can be provided for the pilot. Relevant information, such as checklists relating to an emergency, and the status of engine parameters and devices can be readily communicated to the pilot using the graphical display.

In some embodiments, the pilot can indicate an emergency condition by an input to the system: a pushbutton labeled "Emergency", for example. In some embodiments, the system can detect an emergency automatically and respond automatically. In some embodiments, both pilot input and automatic detection can be provided, and in some embodiments can be selectively enabled or disabled. After the system determines (automatically or from pilot input) that an emergency exists, the system can then determine what type of emergency is occurring, again from sensor outputs, pilot input, or a combination. In the example illustrated in FIG. 6, the pilot can select from the following: Engine Failure, Engine Fire, Alternator Failure, Electrical Fumes, or Manual Control button. These emergencies are typical of single engine aircraft; other emergency types can be used in connection with other types of aircraft.

Figure 6:
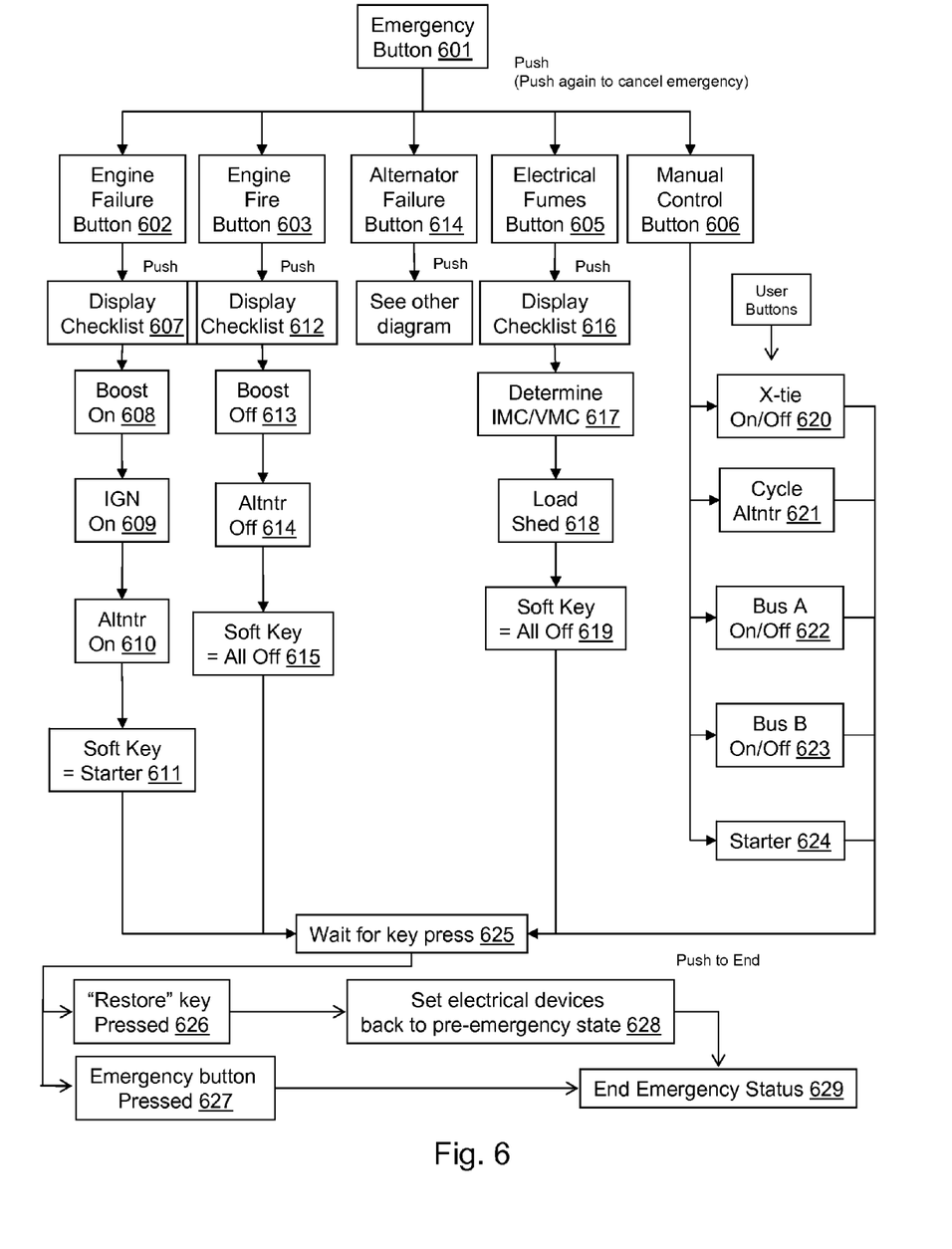
FIG. 6 is a flow diagram of an example method according to the present invention.

Once the type of emergency is determined, the system can display an appropriate checklist for that emergency on the graphical display. A pre-configured sequence of events can be carried out by the system. Additionally, additional pilot input can be accepted, for example using programmable soft keys in connection with the graphical display, with functions as shown in FIG. 6. This can provide additional control and functionality for the pilot. The system can exit the emergency operation after determining that the emergency no longer exists or that the pilot does not desire the assistance of the system. The system can determine that the emergency no longer exists or that the pilot does not desire the assistance of the system by sensor outputs, pilot input, or a combination.

DETAILED DESCRIPTION OF THE INVENTION

Figure 1:
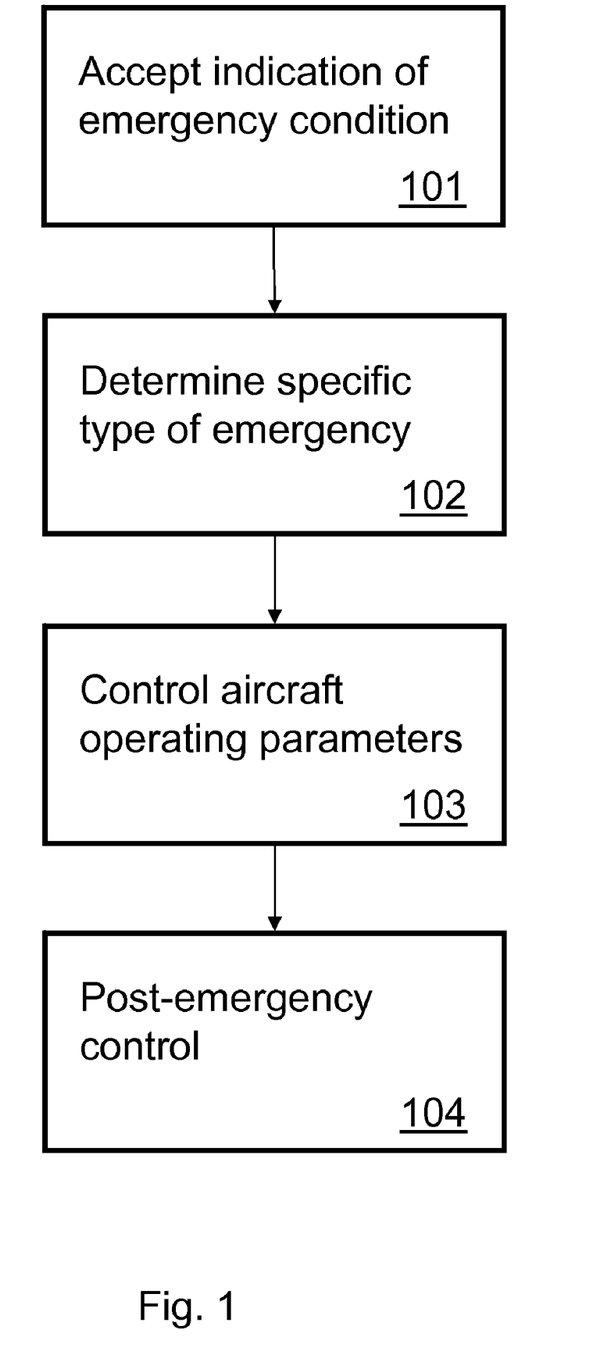
FIG. 1 is a schematic illustration of an example method according to the present invention.

The present invention provides methods and apparatuses for assisting a pilot in identifying and managing emergency conditions in an aircraft. FIG. 1 is a schematic illustration of an example method according to the present invention. An indication of an emergency condition is accepted 101. The indication can be determined automatically from sensor information, or can be determined by pilot input such as a pilot pressing an "emergency" button or giving a voice command that indicates an emergency condition. A specific emergency condition is then determined from a plurality of possible emergency conditions 102. The determination can be performed automatically from sensor information, or can be determined from pilot input such as a pilot pressing a button corresponding to a specific emergency, providing a voice command that identifies the emergency, or providing a series of such inputs, for example by providing responses to prompts from an automated emergency identification system. A plurality of aircraft operating parameters is then controlled as indicated for the specific emergency condition 103. The emergency condition can be determined to be complete after completion of the parameter control, after an input from a pilot, based on sensor information related to the emergency, or a combination thereof. After the emergency condition is complete, the aircraft can be returned to its pre-emergency operating state, or can be left with operating parameters as controlled for the emergency state, or set in a control state defined as the post-emergency state for the determined emergency, or a combination thereof 104.

Figure 2:
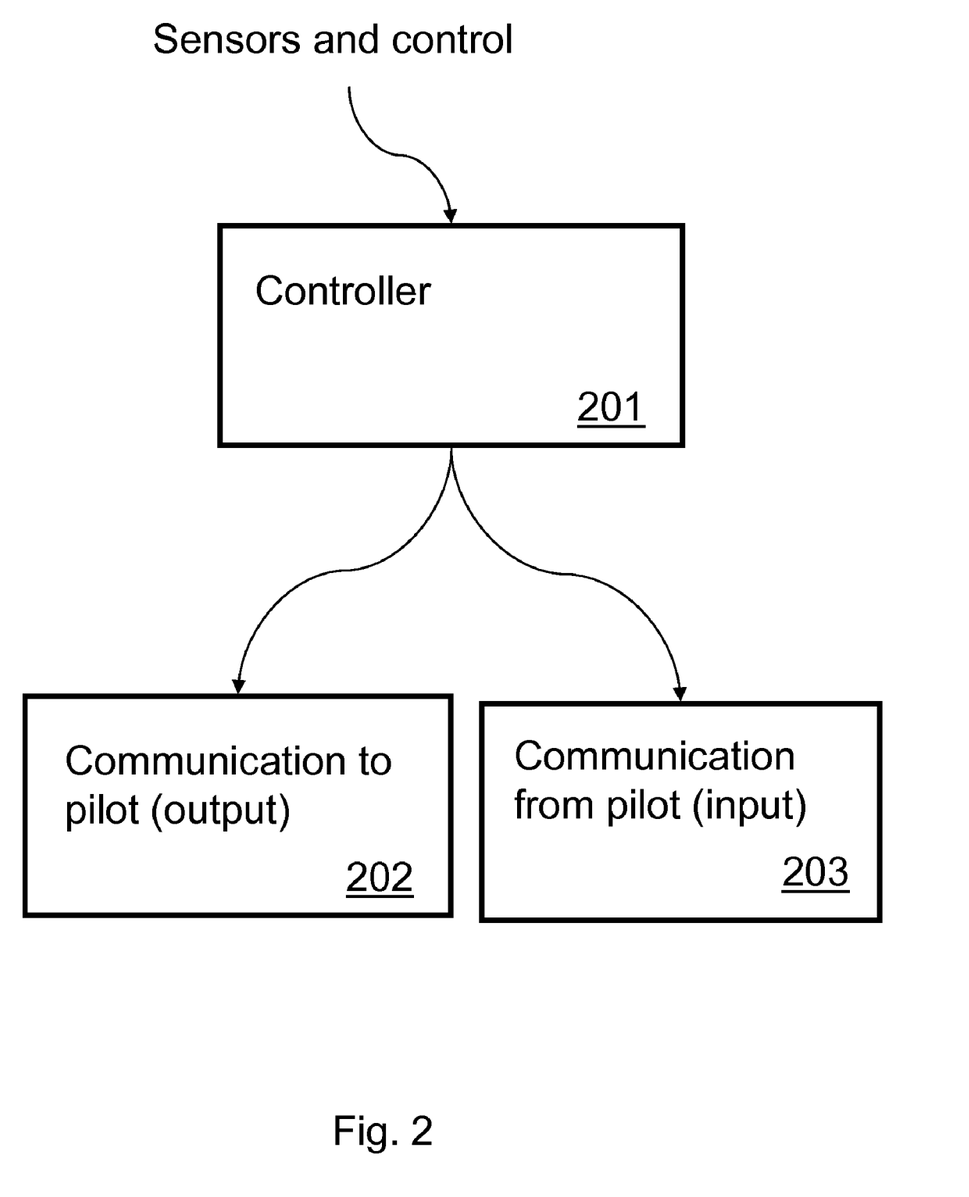
FIG. 2 is a schematic illustration of an example apparatus according to the present invention.

FIG. 2 is a schematic illustration of an apparatus suitable for use with the present invention. A controller 201, such as a single board computer, is connected to operating systems of an aircraft such that the controller can control the connected operating systems, according to a method such as those described in the example embodiments disclosed herein. The controller 201 optionally also accepts input from one or more sensors indicative of the status or performance of aircraft systems. The controller 201 communicates with a pilot output system 202, for example with a video display or with an audio generator, or a combination thereof. The controller 201 also communicates with a pilot input system 203, for example with a touch-sensitive display screen, buttons or knobs, and audio input system, or other input system.

In operation, the controller 201 can determine the existence of an emergency condition from sensor information or by input from a pilot via the pilot input system 203. The controller 201 can determine a specific emergency condition from a plurality of defined emergency conditions, for example from sensor information that can indicate aircraft systems or combinations of systems that correspond to a specific emergency condition, or from pilot input via the pilot input system 203, by direct specification by the pilot or confirmation by the pilot of an emergency condition from a set of possible emergency conditions presented to the pilot via the pilot output system 202. The controller 201 can have stored a set of operating parameters that correspond to each of several emergency conditions. The stored set can also be augmented or customized by sensor information, for example, an operating parameter can be stored as an absolute control setting or as a relative change to a control setting (e.g., "set parameter to half the previous value"), and as a conditional change (e.g., "if sensor exceeds a threshold, then set parameter"), or combinations thereof. After the specific emergency condition is identified, the set of operating parameters can be used to control the aircraft. The control can be done automatically upon determination of the specific emergency condition, or can be done after confirmation from the pilot of specific actions or sets of actions, or a combination thereof. The control can establish fixed parameter settings, or can vary operating parameters in a predetermined or in response to sensor information. If the specific emergency condition can be terminated or ended, then the controller 201 can determine the end of the condition by sensor information, lapse of time, or pilot input via the pilot input system 203. The controller 201 can set aircraft control parameters at the end of the emergency condition according to the specific emergency condition, pilot input, or sensor information (e.g., if the emergency was a persistent failure of an aircraft system, the operating parameters might need to remain as set in the emergency condition control, while an emergency condition that can be cured might allow operating parameters to be returned to their pre-emergency condition).

Figure 5:
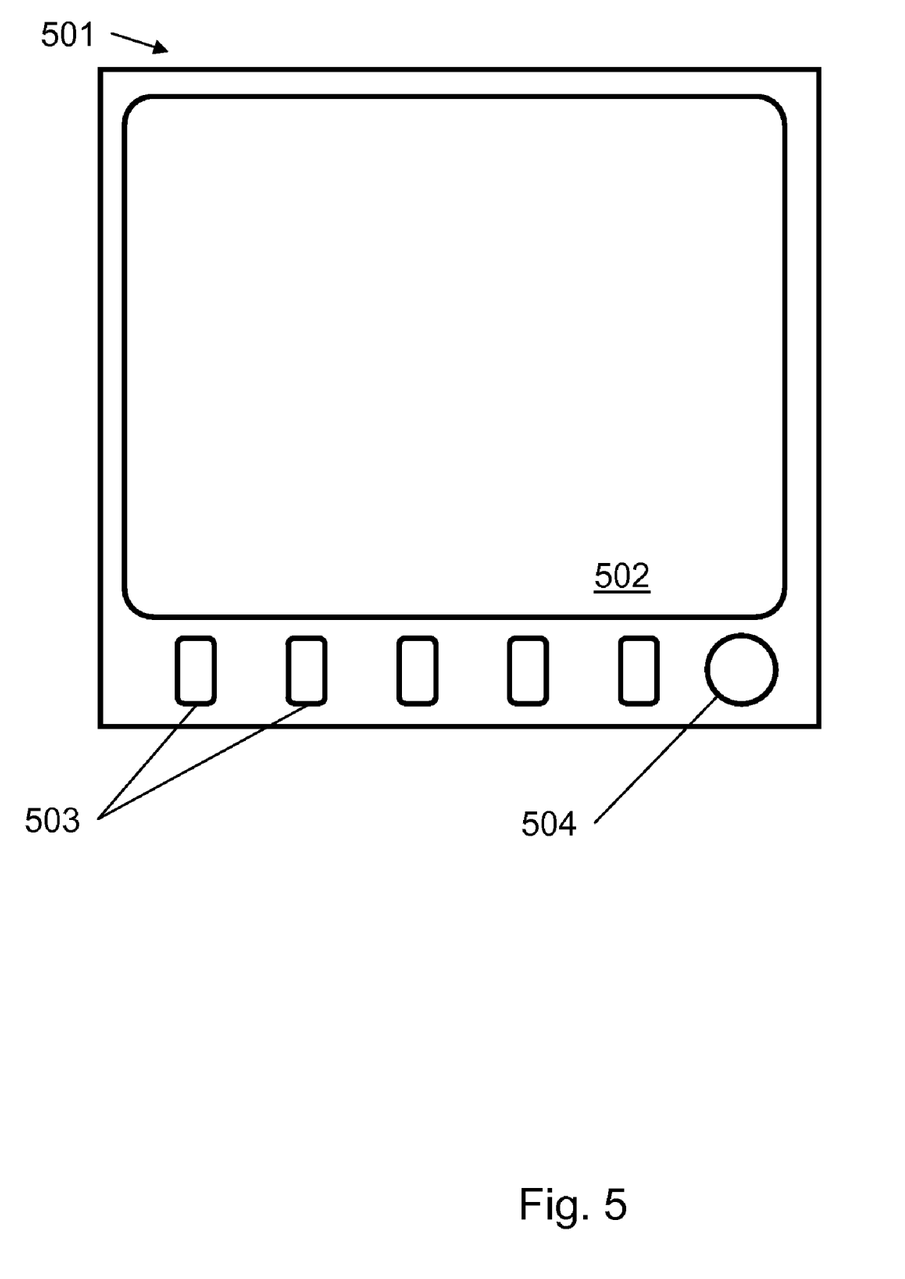
FIG. 5 is a schematic illustration of a display suitable for use with some embodiments of the present invention.

FIG. 5 is a schematic illustration of a display and input apparatus 501 suitable for use with the present invention. The apparatus comprises a visible display screen 502, such as those in contemporary use in computers, phones, and the like. The display screen 502 can be used to communicate information to a pilot, such as the current state of various aircraft operating parameters, and information relative to an emergency condition. A physical input device such as a rotary knob 504 can mount near the display screen 502, for example to allow a pilot to adjust an operating parameter over a range, or select from a range of options displayed on the screen 502. A plurality of physical input devices such as push buttons 503 can mount near the screen 502. Each button can correspond to a specific pilot input communication; for example, one button can be used by a pilot to indicate the presence of an emergency condition. The correspondence of buttons to input communications can also be determined based on the current communications desired. For example, the screen 502 can display information near each button, where the information provides a pilot with a specification of the action indicated by pressing that button. The information displayed and the corresponding actions can thereby be customized to the information most relevant to the current communication with the pilot, allowing a small number of buttons to be used for a wide variety of communications.

Figure 3:
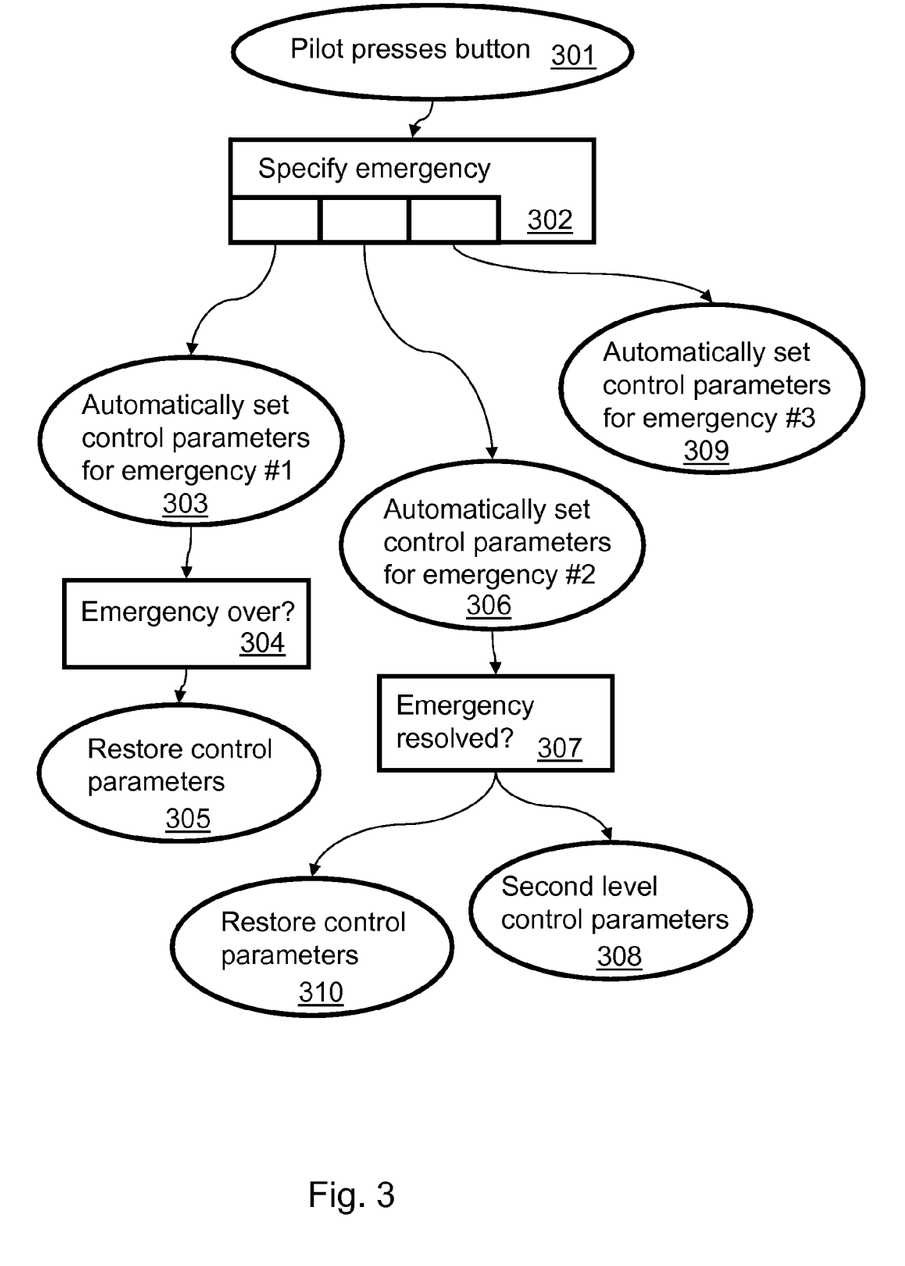
FIG. 3 is a flow diagram of an example method according to the present invention.

FIG. 3 is a flow diagram of an example embodiment of the present invention, illustrating several possible types of emergency conditions. In the example, a pilot can initiate an emergency condition response by pressing a button 301. A display screen 302 and pilot input can then be used to allow the pilot to specify a particular emergency condition. The emergency conditions communicated to the pilot can be a complete list of possible emergency conditions, or can be selected from sets of conditions most likely based on the current aircraft operation (e.g., taxi or climb) or current sensors (e.g., engine temperature). The example shows three possible emergency conditions; the number of conditions can be more or less than three. Selecting the first condition in the example initiates an automatic setting of various aircraft control parameters to values predetermined for that emergency condition 303. The first emergency condition is of a sort that allows a pilot to indicate that the emergency had ended 304, after which the operating parameters are returned to the pre-emergency settings 305. Selecting the second emergency condition initiates an automatic setting of various aircraft control parameters to values predetermined for that emergency condition 306. The second emergency condition is of a sort that allows the pilot to indicate whether the change in aircraft control parameters 307 has resolved the emergency 307. If it has, then the operating parameters are restored to their pre-emergency conditions 310. If not, then a second level of emergency response control parameters are applied 308. Selecting the third emergency condition initiates an automatic setting of various aircraft control parameters to values predetermined for that emergency condition 309. The third emergency condition is of a sort that does not have an automatic recovery or end, and so the operating parameters are left in the settings predetermined as appropriate for response to that emergency condition.

Figure 4:
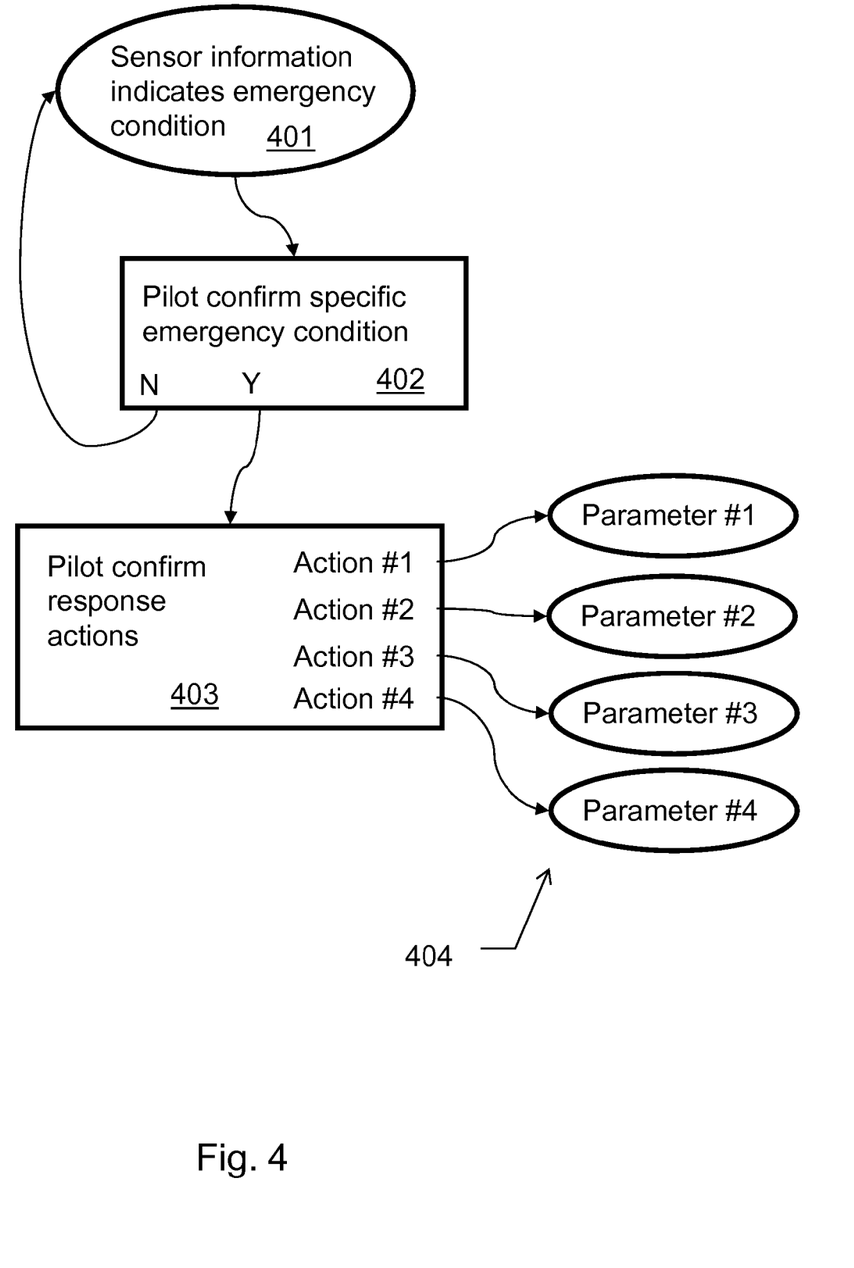
FIG. 4 is a flow diagram of an example method according to the present invention.

FIG. 4 is a flow diagram of an example embodiment of the present invention. In the example embodiment, an emergency condition can be determined 401 from sensor information. The emergency condition can be confirmed 402 by communication with a pilot, for example by displaying information concerning the sensor information and the possible emergency condition. If the pilot does not confirm the emergency condition (because it does not exist, or because the pilot does not desire automated assistance in managing it), then the aircraft can be returned to normal operations. If the pilot confirms the emergency condition, then suggested settings to the aircraft operating parameters can be communicated to the pilot 403. The suggested settings can be specific to the determined emergency condition, and can also be derived from sensor information related to the emergency condition. The suggested settings can be applied automatically, or can be suspended until confirmed by the pilot. For example, the pilot can confirm each suggested setting by pushing a button, a region on a touch-sensitive screen, or supplying a voice command. The suggested settings can also be modified by the pilot in similar ways. The confirmed operating parameter settings can then be applied to the operation of the aircraft 404.

FIG. 6 is a flow diagram of an example embodiment of the present invention. A pilot can indicate that an emergency condition is current, for example by pressing an input button 601 like those described in connection with FIG. 5. A plurality of possible specific emergency management functions can be displayed to the pilot, and the pilot allowed to select one, for example by displaying the emergency management functions on a display screen and using input buttons like those described in connection with FIG. 5. In the example of FIG. 6, the possible emergency management functions are Engine Failure 602, Engine Fire 603, Alternator Failure 604, Electrical Fumes 605, and Manual Control 606.

If the pilot selects the Engine Failure management function, then a checklist relevant to an engine failure condition can be displayed 607. The boost can be automatically set to on 608; the engine ignition system can be automatically set to on 609, the alternator can be automatically set to on 610, and an input button set to correspond to activation of the starter 610. The pilot can then start the engine by pressing the button, with the relevant operating parameters already set.

If the pilot selects the Engine Fire management function, then a checklist relevant to an engine fire can be displayed. The boost can be automatically turned off 613, the alternator can be automatically turned off 614, and an input button set to correspond to turning off all engine systems 615.

If the pilot selects the Electrical Fumes management function, then a checklist relevant to a condition generating electrical fumes can be displayed 616. The weather conditions can be determined 617, for example by sensors, reading a switch, sensing a soft button configured by the system, or accepting a voice or similar input from the pilot. The electrical loads on the aircraft's electrical system can be turned off, isolated, or otherwise shed 618. The particular loads shed can be dependent on the weather conditions, with different load shed parameters used depending on the result of the IMC/VMC determination. An input button can be set to correspond to turning off all electrical systems 619.

If the pilot selects the Manual Control management function, the input buttons can be set to correspond to control adjustments likely to used in various emergency conditions. The crosstie can be toggled between on and off by a button 620. The alternator can be cycled responsive to a button 621. The Bus A can be toggled between on and off by a button 622. The Bus B can be toggled between on and off by a button 623. The started can be engaged responsive to a button 624.

Selection of the Alternator Failure button can initiate various courses of action, depending on the specific design of the aircraft electrical system. Examples are discussed in connection with FIG. 7 and FIG. 8.

After each of the emergency management functions, the pilot can indicate either Restore 626 or Emergency 627. If Restore is indicated, then the operating parameters adjusted during the emergency management function are restored to their settings before the adjustments. If Emergency is indicated, then the operating parameters are left as they were adjusted, and the emergency management system completed 629.

Figure 7:
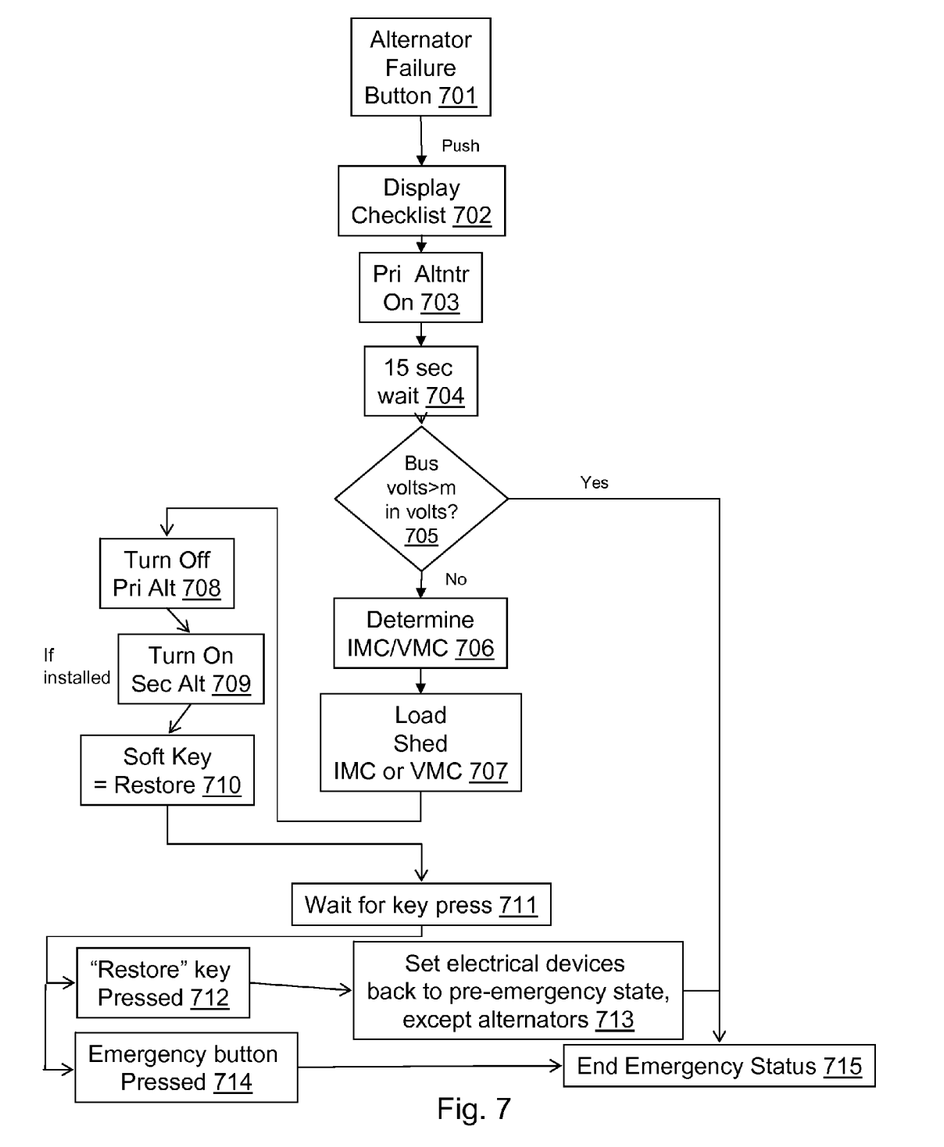
FIG. 7 is a flow diagram of an example method of managing an alternator failure according to the present invention.
Figure 9:
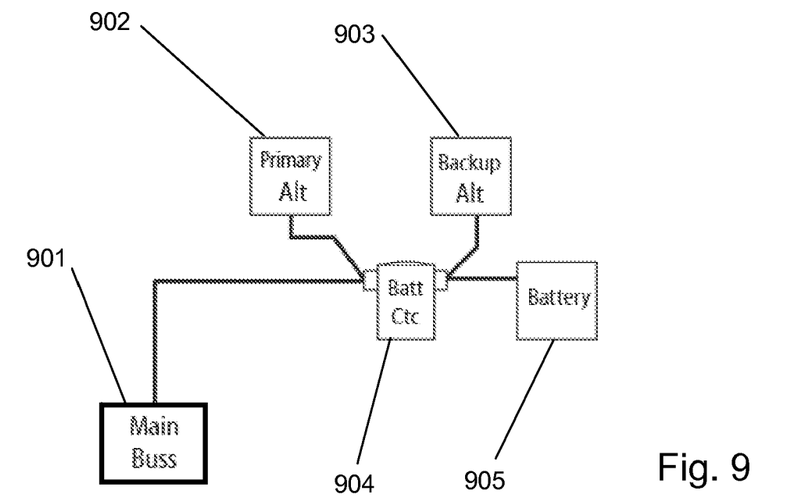
FIG. 9 and FIG. 10 are schematic illustrations of buss architectures accommodated by example embodiments of the present invention.

FIG. 9 is a schematic illustration of a first example bus architecture. A Main Bus 901 is in electrical communication with a Battery Contactor 904. The Battery Contactor 904 is in electrical communication with a Primary Alternator 902 and a Backup Alternator 903, and with a Battery 905. FIG. 7 is a flow diagram of an Alternator Failure emergency management function suitable for use with such a bus architecture. The function can be initiated by a pilot indicating an Alternator Failure 701. A checklist relevant to an alternator failure can be communicated to the pilot 702. The primary alternator can be turned on 701, and a suitable amount of time allowed to elapse 704. The bus voltage can then be sensed 705; if the bus voltage exceeds the minimum threshold, then the emergency condition can be ended 715 (this situation can arise, for example, if the primary alternator had been inadvertently turned off). If the bus voltage does not exceed the minimum threshold, then The weather conditions can be determined 706, for example by sensors, reading a switch, sensing a soft button configured by the system, or accepting a voice or similar input from the pilot. Load is then shed from the system, with the particular loads shed determined from the results of the IMC/VMC determination 707. The primary alternator is then turned off 708 and the secondary alternator turned on 709. The pilot can indicate 712 that the pre-emergency conditions should be restored 710, in which case all electrical devices are restored to their pre-emergency conditions except the alternators 713. Alternatively, the pilot can indicate 714 that the emergency condition has ended, and the aircraft is operated with the electrical devices left in the state set during the emergency management function.

Figure 8:
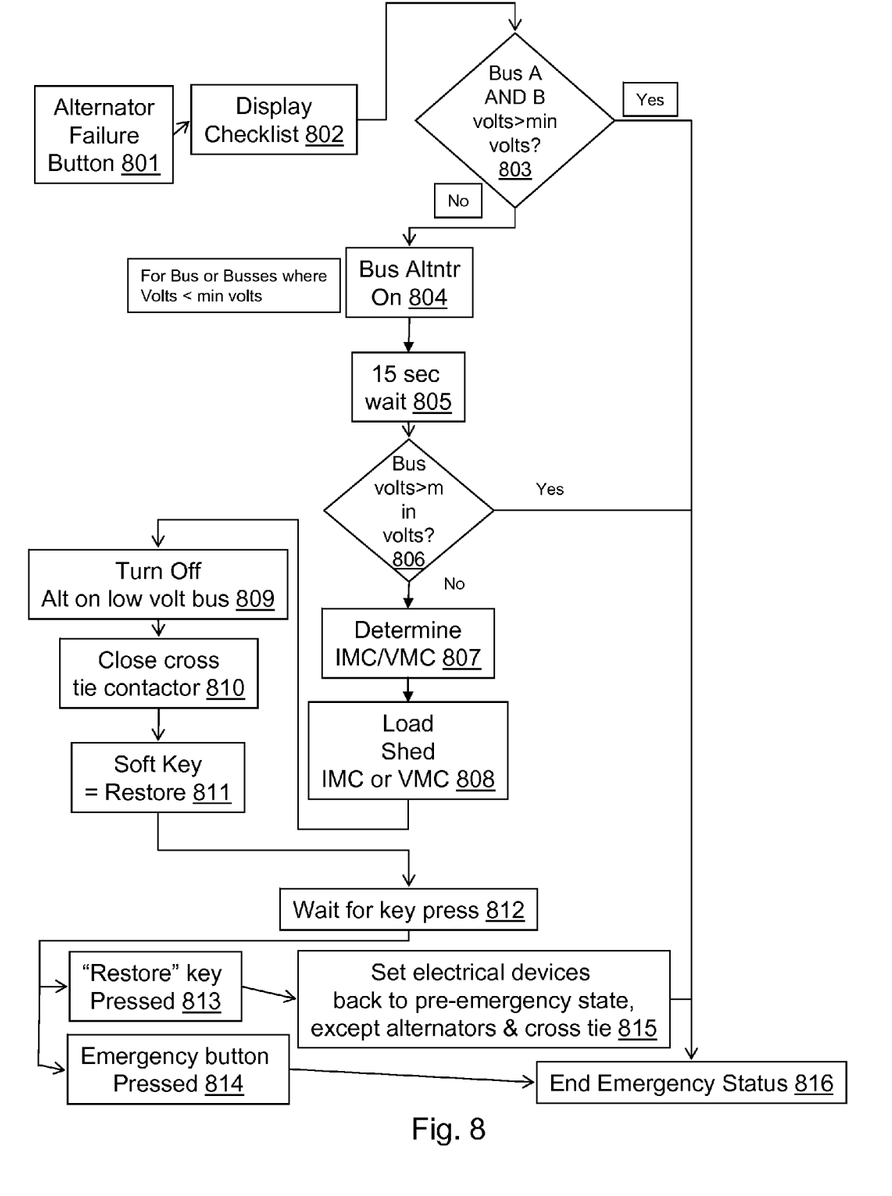
FIG. 8 is a flow diagram of an example method of managing an alternator failure according to the present invention.
Figure 10:
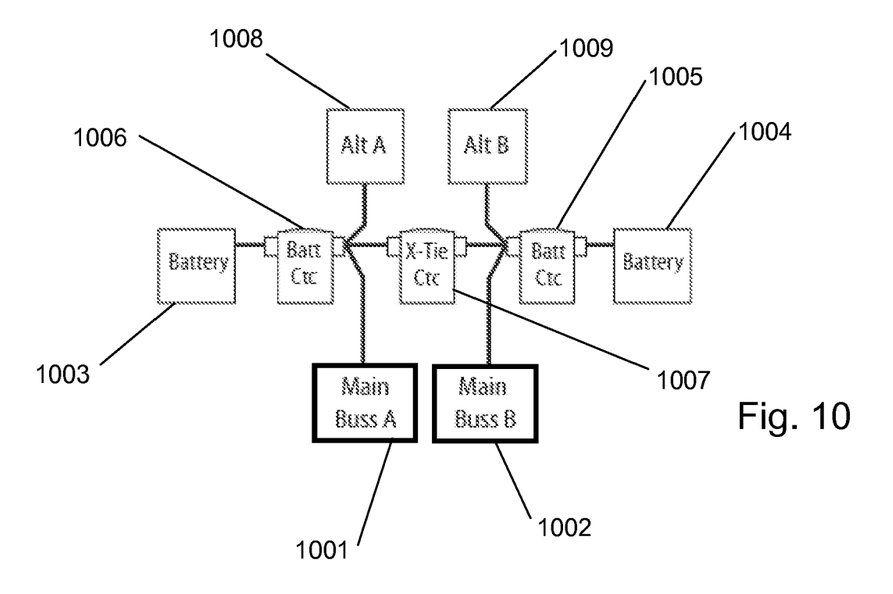

FIG. 10 is a schematic illustration of a second example bus architecture. A first battery 1003 is in electrical communication with a first battery contactor 1006. The first battery contactor 1006 is in electrical communication with a first alternator 1008, a first main bus 1001, and a cross tie connector 1007. A second battery 1004 is in electrical communication with a second battery contactor 1005. The second battery contactor 1005 is in electrical communication with a second alternator 1009, a second main bus 1002, and the cross tie connector 1007. FIG. 8 is a flow diagram of an emergency management function suitable for use with such a bus architecture. A pilot can indicate an alternator failure 801, for example by pressing a button as described before. A checklist relevant to an alternator failure can be communicated to the pilot 802, for example by a display as described before. Both busses can be sensed to determine if either has a voltage less than a minimum threshold 806. If both busses have voltages greater than the minimum threshold, then the emergency condition is ended 816. Is a has a voltage less than the minimum threshold, then the weather conditions can be determined 807, and load can be shed from the bus 808 (with the particular loads shed dependent on the result of the IMC/VMC determination), and the alternator on the low voltage bus turned off 809. The cross tie contactor can be closed 810, connecting the first and second battery contactors. The pilot can indicate 813 that the pre-emergency conditions should be restored 815, in which case all electrical devices are restored to their pre-emergency conditions except the alternators 815. Alternatively, the pilot can indicate 814 that the emergency condition has ended, and the aircraft is operated with the electrical devices left in the state set during the emergency management function.

Example Embodiment

Figure 11:
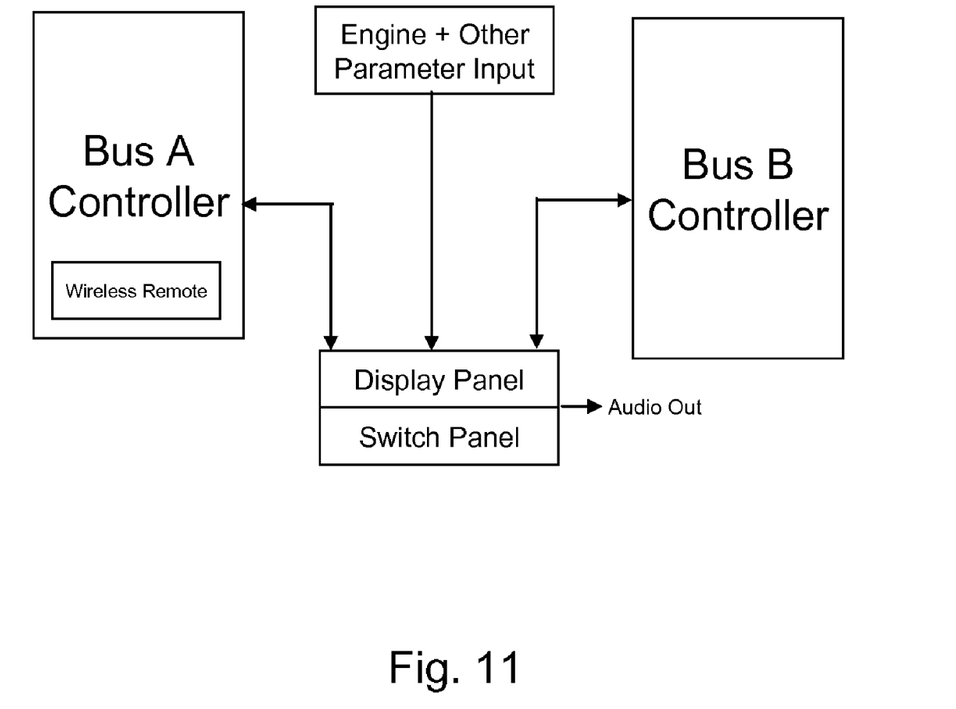
FIG. 11 is a schematic block diagram of an example embodiment of the present invention.

FIG. 11 is a schematic block diagram of an example embodiment of the present invention. A Display Panel accommodates communication of information to a pilot. A Switch Panel accommodates communication of information from a pilot. A single or dual redundant controller(s) can be used to determine state, to set controls, to control the display, to accept input in between the sensors and the display/switch. Sensors corresponding to various attributes of aircraft, such as those discussed above, provide information to the controller. The controller determines the state of the aircraft from the attributes, for example as described above. The controller sends information to the display which accepts input based on the determined state. For example, the controller can accept input from one or more switches, where the switches are defined to have specific meanings depending on the determined state. The controller initiates control of various aircraft attributes, for example those described above, based on the determined state and on pilot input. While the controller and display functions are described separately for convenience, they can be integrated in a single system, or part of the controller can be integrated with the display while part is separate from the display.

A suitable display panel can comprise appropriate technology for aircraft use. A width of no more than 6.25" can allow the system to readily fit in a standard radio rack. The system can operate in all temperature ranges expected in the aircraft cockpit environment, for example, typically −30 deg C. to +70 deg C. The screen can be daylight readable, for example with a transflective screen or transmissive screen with a brightness greater than about 500 nits. A suitable switch panel can comprise a portion of a touch sensitive display configured by the controller for pilot input. It can also comprise discrete switches mounted near the display, voice recognition, or remotely mounted switches. Switches can have high quality, gold-plated contacts for desirable reliability. The sensor interface converts analog signals from commercially-available temperature, pressure, and other analog sensors to digital signals that can be processed by the microcomputer. The controllers can be implemented using commercially available switching devices and current sensing devices, with interfaces to the microcomputer.

A suitable controller can be implemented with a conventional single board microcomputer, with discrete logic, with programmable logic, or application specific integrated circuits, or combinations thereof. A typical microprocessor is a Motorola HCS12 or comparable with built-in serial I/O and at least 256 KB of non-volatile memory. A programmable controller implementation can execute software developed using conventional programming techniques such as C programming language.

Figure 12:
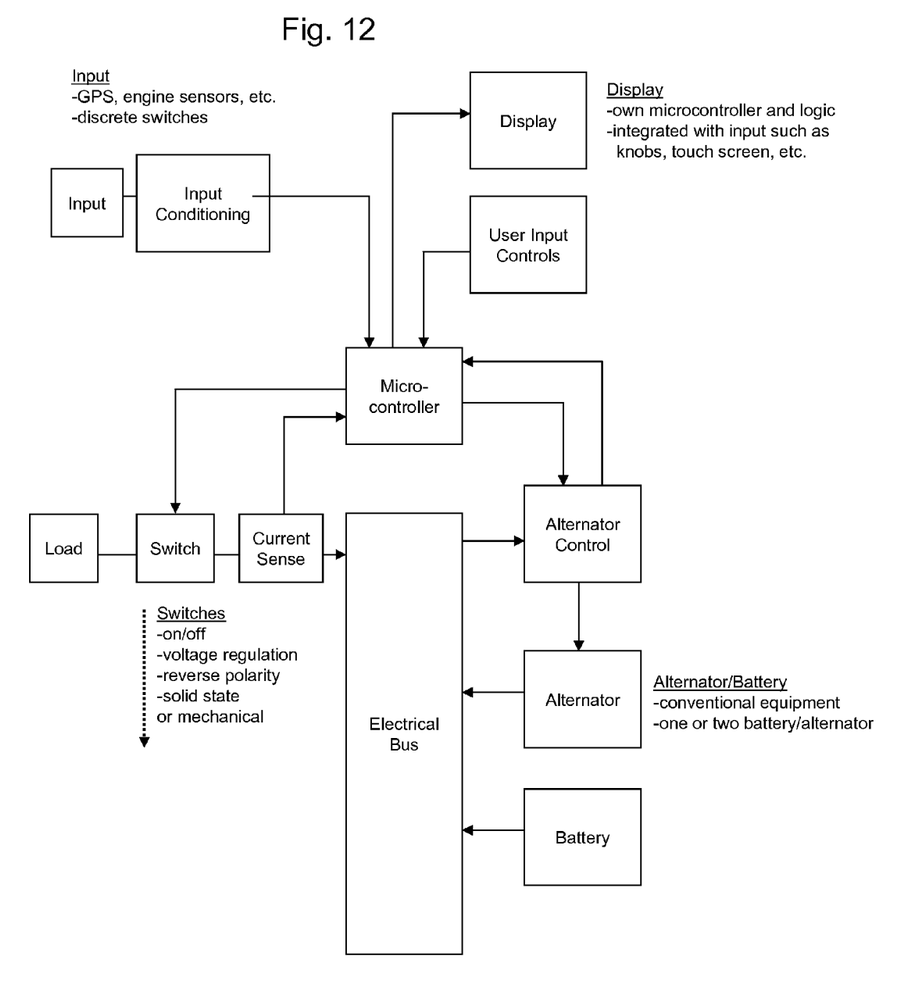
FIG. 12 is a schematic illustration of an example embodiment of the present invention.

FIG. 12 is a schematic illustration of an embodiment of the present invention. A Microcontroller is programmed to implement functionality such as that described in the examples described herein. The Microcontroller accepts Input from sensors and other systems, configured for access by the Microcontroller, if needed, by appropriate Input Conditioning. The Microcontroller also accepts input from the user via User Input Controls. The Microcontroller outputs signals to control a Display, mounted to communicate with the pilot. An Alternator Control system communicates with the Microcontroller and controls and senses operation of one or more alternators. The Alternators and Battery connect to an Electrical Bus. The Microcontroller controls various Switches (and senses their configuration by, for example, Current Sense). The Switches can control various Loads, such as various systems of the aircraft.

Figure 13:
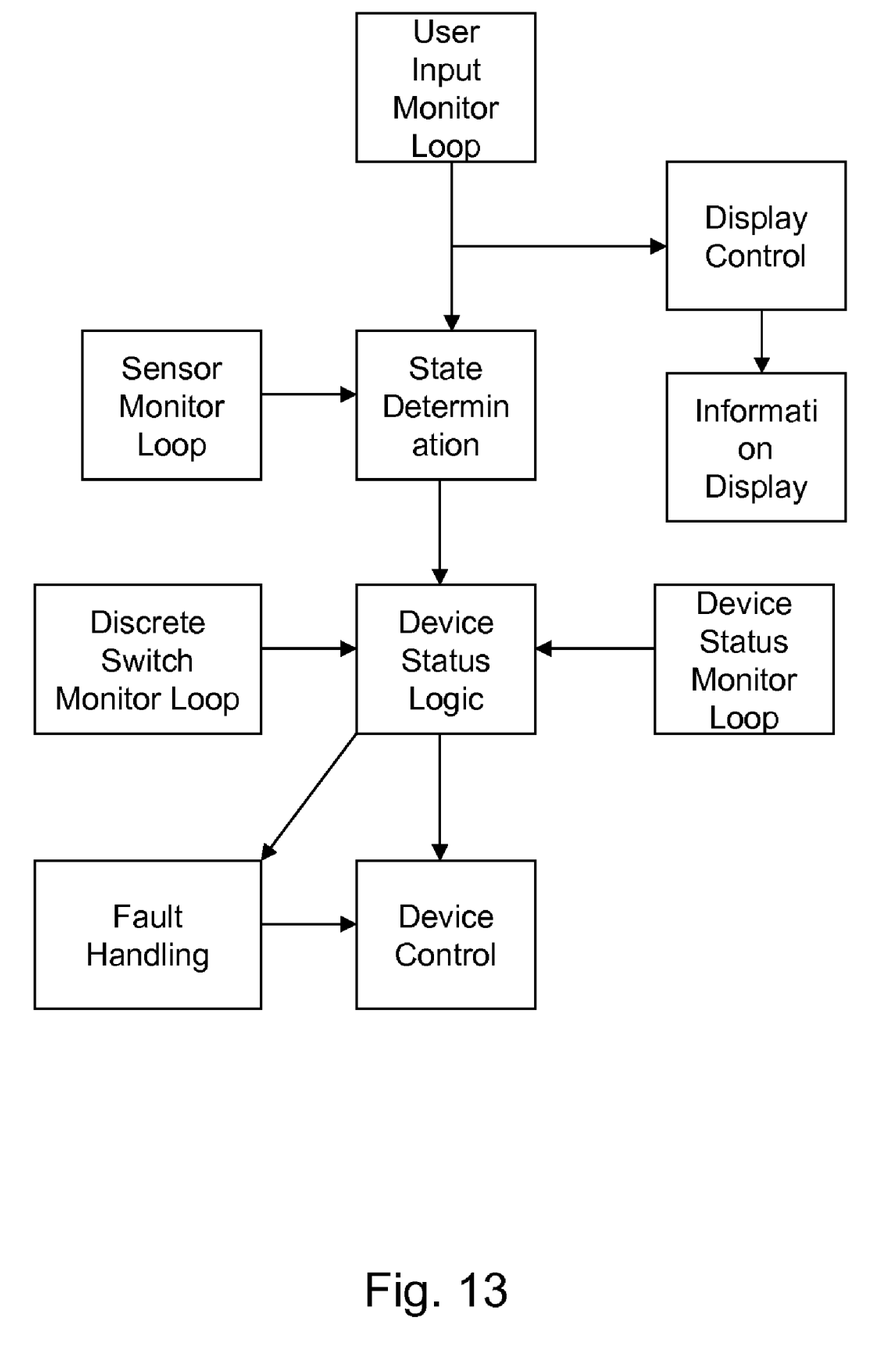
FIG. 13 is a schematic illustration of computer software suitable for implementing an embodiment of the present invention.

FIG. 13 is a schematic illustration of computer software suitable for implementing an embodiment of the present invention. A User Input Monitor Loop monitors input from the user; a Sensor Monitor Loop monitors input from aircraft sensors. A State Determination function determines the state of the aircraft from the user input and the aircraft sensors. A Device Status Monitor Loop and a Discrete Switch Monitor Loop provide input to Device Status Logic, which can control devices (Device Control) in combination with a Fault Handling function. A Display Control function can combine information from the various other functions to control an Information Display. Those skilled in the art will appreciate various other implementations, including other software approaches, approaches using multiple processors, and other combinations of hardware and software.

The particular sizes and equipment discussed above are cited merely to illustrate particular embodiments of the invention. It is contemplated that the use of the invention can involve components having different sizes and characteristics. It is intended that the scope of the invention be defined by the claims appended hereto.

We claim:

1. A method of assisting a pilot in management of an emergency condition in an aircraft, comprising:

(a) accepting an indication of the presence of an emergency condition;
(b) determining a specific emergency condition from a plurality of possible emergency conditions;
(c) automatically controlling a plurality of operating parameters of the aircraft responsive to the specific emergency condition.

2. A method as in claim 1, wherein the possible emergency conditions include one or more of engine failure, engine fire, alternator failure, and electrical fumes.

3. A method as in claim 1, wherein the plurality of operating parameters include one or more of fuel boost, alternator power, electrical system load, engine starter, and bus cross tie contactor.

4. A method as in claim 1, wherein, if the specific emergency condition is an engine failure, then automatically turning on the fuel boost, the engine ignition system, and the alternator, and then activating the engine starter in response to further direction from a pilot.

5. A method as in claim 1, wherein, if the specific emergency condition is an engine fire, then automatically turning off the fuel boost and the alternator; and turning off additional electrical systems in response to further input from a pilot.

6. A method as in claim 1, wherein, if the specific emergency condition is electrical fumes, then determining weather conditions, and automatically shedding load from the aircraft electrical system, where the specific loads shed are determined in part from the weather conditions, and turning off additional electrical systems in response to further direction from a pilot.

7. A method as in claim 1, wherein, if the specific emergency condition is alternator failure, and the aircraft has a single bus, then automatically turning the primary alternator on, waiting a predetermined time, then determining whether the bus voltage is above a threshold, and if not, then turning off primary alternator, determining weather conditions and shedding loads from the aircraft electrical system, where the specific loads shed are determined in part from the weather conditions, then turning on the backup alternator, if present.

8. A method as in claim 1, wherein, if the specific emergency condition is alternator failure, and the aircraft has a dual bus, then determining whether either bus voltage is below a threshold, and if so, then automatically turning the alternator associated with that bus on, waiting a predetermined time, then determining whether the bus is above a predetermined threshold, and, if not, then turning off alternator on failed bus,determining weather conditions and shedding loads from the bus, where the specific loads shed are determined in part from the weather conditions, and closing the cross tie contactor.

9. A method as in claim 1, further comprising determining if the emergency condition has abated, and, if so, then automatically returning all aircraft operating parameters to their pre-emergency states.

10. A method as in claim 1, further comprising determining if the emergency condition has abated, and, if so, then automatically returning some aircraft operating parameters to their pre-emergency state and leaving other aircraft operating parameters in the state established under automatic control.

11. A method as in claim 1, wherein accepting an indication of the presence of an emergency condition comprises an input from a pilot.

12. A method as in claim 1, wherein accepting an indication of the presence of an emergency condition comprises determining the presence of an emergency condition from a combination of a plurality of sensors.

13. A method as in claim 1, wherein determining the specific emergency condition comprises accepting a pilot input specifying a specific emergency condition.

14. A method as in claim 1, wherein determining the specific emergency condition comprises determining a specific emergency condition from a combination of a plurality of sensors.

15. A system for assisting a pilot of an aircraft in the management of an emergency condition, comprising:
(a) an emergency presence element, configured to determine the presence of an emergency condition from sensor signals, pilot input, or a combination thereof;
(b) an emergency determination element, configured to determine a specific emergency condition from sensor signals, pilot input, or a combination thereof;
(c) a response element, configured to automatically control a plurality of operating parameters responsive to the specific emergency condition.

16. A system as in claim 15, wherein the emergency presence element comprises a switch actuable by a pilot to indicate the presence of an emergency.

17. A system as in claim 15, wherein the emergency determination element comprises a display configured to communicate to a pilot a plurality of possible emergency conditions, and one or more pilot input mechanisms allowing a pilot to select one of the plurality of possible emergency conditions.

18. A system as in claim 17, wherein at least one of the pilot input mechanisms comprises a soft button controlled in coordination with the display.

19. A system as in claim 15, wherein the emergency presence element is further configured to determine when the emergency condition is abated.

20. A system as in claim 19, wherein the response element is further configured to control one or more operating parameters to their pre-emergency state responsive to an indication that the emergency condition is abated.

21. A system as in claim 15, further comprising a display configured to communicate to a pilot a checklist of actions corresponding to a specific emergency condition.

\* \* \* \* \*